US008583697B2

(12) United States Patent
Narayan et al.

(10) Patent No.: US 8,583,697 B2
(45) Date of Patent: Nov. 12, 2013

(54) SYSTEM AND METHOD OF PROCESSING CONTENT (75) Inventors: Pramodh Narayan, Mineola, NY (US); Matthew A. Terry, Dunwoody, GA (US); Leroy W. Tilt, IV, Canton, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 1519 days.

(21) Appl. No.: 11/462,577

(22) Filed: Aug. 4, 2006

(65) Prior Publication Data
US 2008/0033988 A1 Feb. 7, 2008

(51) Int. Cl.
*G06F 17/30* (2006.01)
(52) U.S. Cl.
CPC .............................. *G06F 17/30286* (2013.01)
USPC ........................................ 707/802; 707/703
(58) Field of Classification Search
USPC ................... 707/104, 802; 715/526; 719/314; 717/101; 709/228
See application file for complete search history.

(56) References Cited

U.S. PATENT DOCUMENTS

| 7,055,134 | B2 | 5/2006 | Schroeder |
| 7,072,807 | B2 | 7/2006 | Brown et al. |
| 2004/0010598 | A1* | 1/2004 | Bales et al. .................... 709/228 |
| 2006/0036941 | A1* | 2/2006 | Neil ............................... 715/526 |
| 2006/0195816 | A1* | 8/2006 | Grandcolas et al. ........... 717/101 |
| 2008/0071912 | A1* | 3/2008 | Moore et al. ................... 709/227 |
| 2008/0086402 | A1* | 4/2008 | Patel et al. ...................... 705/35 |
| 2008/0086736 | A1* | 4/2008 | Timmons ....................... 719/314 |

OTHER PUBLICATIONS synonyms.com, "preclude" implies "prevent".*
synonyms.com, "restrict" i,plies "control".*
Webopedia definition of portlet, pp. 1-3.*
The Intel® XML Content Router pp. 1-7 downloaded on Jul. 26, 2006, at www.intel.com/cd/ids/developer/asmo-na/eng/259267.htm.

* cited by examiner

*Primary Examiner* — Shahid Alam
(74) *Attorney, Agent, or Firm* — Matthew Chung; Roberts Mlotkowski Safran & Cole, P.C.

(57) ABSTRACT

A system and method for centrally processing content, independent of an end user application. The method includes receiving a request for information from one or more end user applications and retrieving all pieces of content, associated with the request, from one or more repositories. The method further includes centrally processing the pieces of content independent of the one or more applications to determine which content is relevant to request and exposing the relevant content to the one or more applications based results of the processing.

48 Claims, 4 Drawing Sheets

SYSTEM AND METHOD OF PROCESSING CONTENT

FIELD OF THE INVENTION

The invention generally relates to a system and method of processing content and, more particularly, to a service oriented content framework which is configured to process content at a centralized location thereby removing the burden of content processing from end user applications.

BACKGROUND OF THE INVENTION

Whether accessing content through a public or private portal, a content manager may design the content as static, dynamic, or a mix of static and dynamic. As the name implies, the content of a static web page remains static and does not change unless you replace it manually with fresh content. Apart from ease of design, static web pages are much less demanding on resources than that of dynamic web pages. As a result, static web pages load faster and are easy to locate over a diverse network.

On the other hand, dynamic web pages have content that is stored in a database (server) and rendered as web pages or portlets within web pages when requested by website users. The design of such web pages can be customized to individual users or group of users using attributes, business rules, etc. That is, the web pages and more particularly the portlets can be filtered, depending on the access level of the user using, for example, attributes, business rules, etc. Thus, the database-driven dynamic websites are useful where content changes frequently, but requires immense resources to maintain the content.

In a large portal application with numerous content selection rules, selecting the right pieces of content for the user's authorization, attributes, and business rules becomes very complex. Also, in web service distribution applications, the ability to control access to groups in a given time period or using other constraints is very resource intensive.

By way of one example, a retail store website may offer many different types of promotions each targeted to a specific category of users. These promotions may include, for example, a 10% discount to those users having a line of credit with the retail store, while another type of promotion may be a 5% discount on selected items to those users having made a purchase from the retail store within the last 10 days. These promotions may be rendered as portlets within a web page, itself.

To access the content, all pieces of the content (all portlets) for each and every scenario associated with the request must be uploaded to the end user application where it is processed. More specifically, regardless of the business rules, attributes and/or user's level of access, all of the pieces of content associated with the promotion (or other portlet information) is uploaded to the end user application, where it is processed. Only after the content is processed by the end user application can the relevant portlet be accessed by the end user.

The processing that takes place at the end user application, though, places a heavy burden on the end user application. Also, since the content may be coded at different repositories, e.g., servers, it makes it more difficult to manage such content; that is, it is not possible to efficiently manage the content at the end user application. For example, content can remain exposed even though the content has expired.

Accordingly, there exists a need in the art to overcome the deficiencies and limitations described hereinabove.

SUMMARY OF THE INVENTION

In a first aspect of the invention, a method comprises receiving a request for information from one or more end user applications and retrieving all pieces of content, associated with the request, from one or more repositories. The method further includes centrally processing the pieces of content independent of the one or more applications to determine which content is relevant to request and exposing the relevant content to the one or more applications based results of the processing.

In another aspect of the invention, a system comprises a server having a database containing pieces of content, and at least one of a hardware and software component. The hardware and/or software component retrieves all pieces of content associated with a request and processes the pieces of content independent of one or more user applications through an xml file which identifies the content across an entire set of content. The hardware and/or software component exposes relevant content of the pieces of content to the one or more user applications based on the processed results.

In yet another aspect of the invention, a computer program product comprises a computer usable medium having readable program code embodied in the medium. The computer program product includes at least one component to receive a request for information from one or more applications and retrieve all pieces of content, associated with the request, from one or more repositories. The at least one component centrally processes the pieces of content using user and content management attributes. The process is performed independent of the one or more applications. The at least one component further exposes relevant content of the pieces of content to the one or more applications based on the centrally processed results.

In another aspect of the invention, a method for deploying an application for processing content comprises providing a computer infrastructure being operable to:

retrieve all pieces of content, associated with a request, from one or more repositories;

centrally process the pieces of content through an xml file which uniquely identities the content across an entire set of content, the processing being performed independent of one or more end user applications; and expose relevant content of the pieces of content to the one or more applications based on the centrally processed results.

DETAILED DESCRIPTION OF EMBODIMENTS OF THE INVENTION

The invention generally relates to a system and method of processing content at a centralized framework thus decreasing the demands placed on resources of the end user application. More particularly, the system and method of the invention provides a service oriented content framework which provides the ability to expose content from various implementations of content management engines along with its associated restrictions, and facilitates delivery of the appropriate content to the client based on variables such as, for example, date, time, user authorization, user profile attributes, etc. The service oriented content framework processes the content centrally through an xml configuration.

The system and method of the invention is configured to maintain the flexibility of content configuration and restriction with the content administrator while providing content users (viewers) with only relevant content. The system and method removes the burden of content processing from the user's applications such as, for example, a portal, legacy/custom application or web service enabled applications, while maintaining functionality (e.g., processing) at a central location. Keeping the functionality of content centrally located enables a more robust and maintainable solution when managing content in a service oriented architecture.

The system and method of the invention further allows a web service to reject a request before retrieving a credential by expiring access to the web service before the credential is retrieved. By way of example, since processing is now performed centrally, the request can be denied prior to uploading such request to the end user application. Thus, for web service deployments, the system and method can augment the UDDI (Universal Description, Discovery and Integration) Registry to expire a service (e.g., access, exposure of a view, etc.) before returning the service to the user if the service is expired. Additionally, the system and method can partially expire a service or content based on the user, group, or other factors through the xml configuration in a non-technical fashion.

Figure 1:
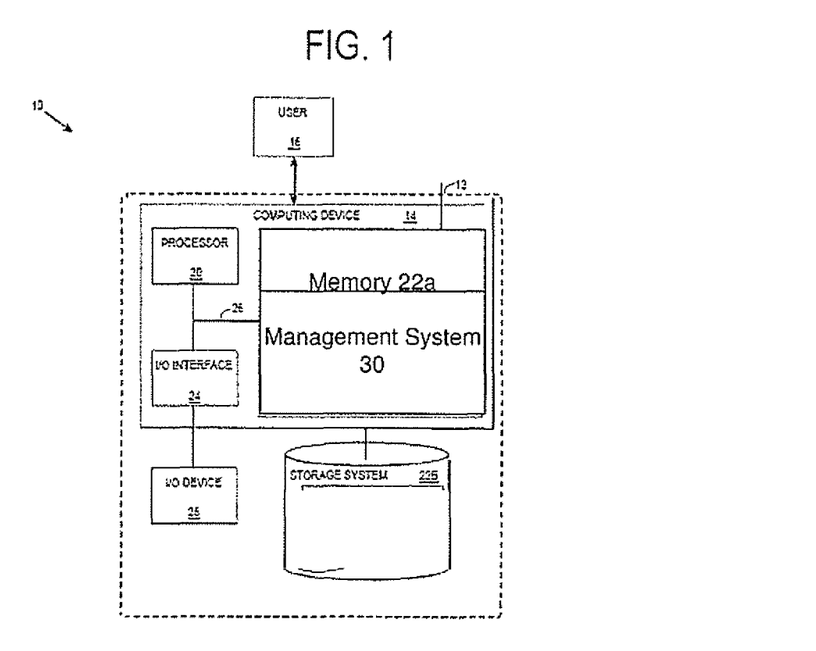
FIG. 1 shows an illustrative environment for implementing the steps in accordance with the invention.

FIG. 1 shows an illustrative environment 10 for managing the processes in accordance with the invention. The environment 10 includes a computer infrastructure 12 that can perform the processes described herein. In particular, the computer infrastructure 12 includes a computing device 14 that comprises a management system 30, which makes computing device 14 operable to process content and facilitate content deployment to end user applications. The computing device 14 includes a processor 20, a memory 22A, an input/output (I/O) interface 24, and a bus 26. Further, the computing device 14 is in communication with an external I/O device/resource 28 and a storage system 22B.

The processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 comprises any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively. The computing device 14 can be implemented searching within any database, over any distributed network or stand-alone server, for example.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link such as a network, a shared memory, or the like, to perform the process described herein. Further, while performing the process described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the process steps of the invention on a subscription, advertising, and/or fee basis. That is, a service provider, such as a Solution Integrator, could offer to perform the processes described herein. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Figure 2:
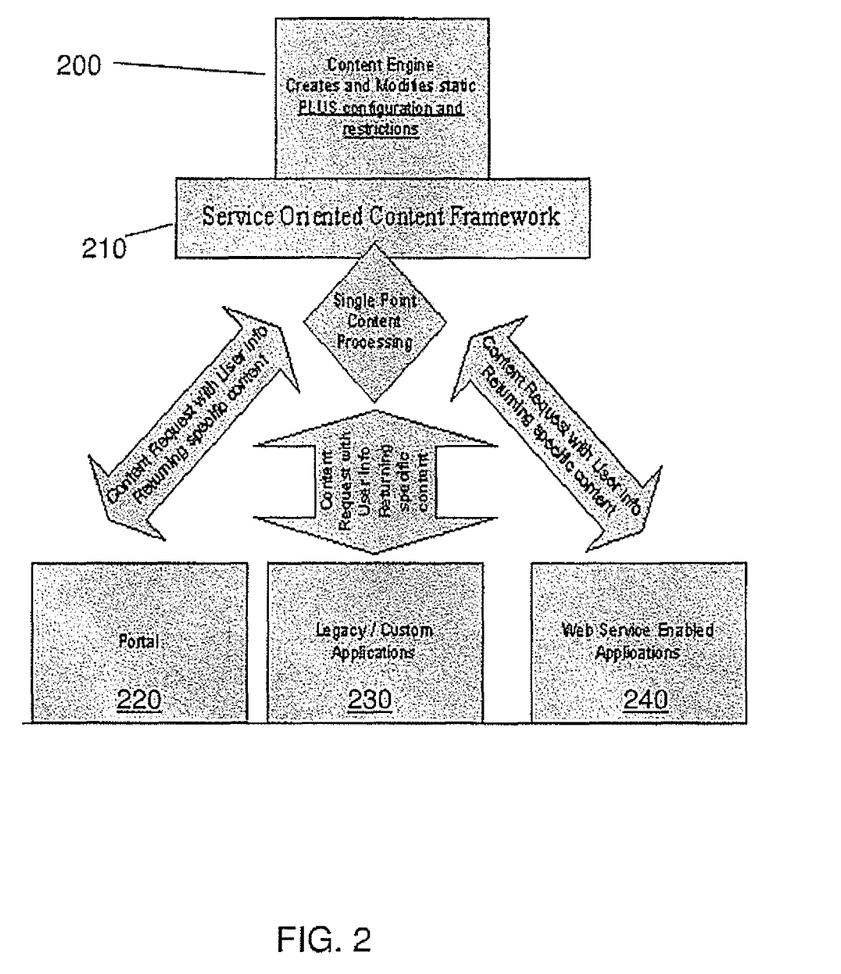
FIG. 2 shows an embodiment in accordance with the invention.

FIG. 2 shows an overview of an embodiment of the invention. In this representation, a content engine 200 creates and modifies content, in addition to modifying configuration and restriction of the content. A central processing module 210 (hereinafter referred generically as a service oriented content framework) 210 is provided as a single point of content processing, as discussed in greater detail below. In the example of FIG. 2, a portal 220, a legacy/custom application 230, and a web service enabled application 240 (or other computer platform capable of accessing a network) requests information from the content engine 200, through the service oriented content framework 210. Upon request of content, as discussed in more detail below, the service oriented content framework 210 centrally processes the request and provides the relevant content to the user.

In an embodiment of the invention, the user 220, 230, 240 may provide user information to the service oriented content framework 210, at the time of requesting content. This information may include, for example, log in information, authentication, user credentials, and/or other attributes, etc. pertinent to certain content. If additional information is required, the service oriented content framework 210 may query the information from an LDAP (Lightweight Directory Access Protocol) or database or flat file, to name a few. The LDAP, database or flat file, etc., in turn, will provide the requested information to the service oriented content framework 210. The information received form the user and/or the LDAP, database or flat file, etc., is used to process and return relevant content to the user through and xml file. Those of skill in the art should understand that an LDAP is a set of protocols for accessing information directories. LDAP supports TCP/IP and makes it possible for almost any application running on virtually any computer platform to obtain directory information or other information.

In an embodiment of the invention, to process the content, the service oriented content framework 210 includes, for each portlet that displays managed content, an xml file. The xml file describes all the available content for a given portlet. For purposes of this description, a portlet is a specialized content area within a web page that occupies a "window" within the web page. Depending on the content of the website and the user access level, the "window" can display different types of information such as travel information, business news, promotional information, etc relevant to an end user request. Thus, the portlet provides the content manager with the capability to customize the content, appearance and position of the content for individual users.

In embodiments, each piece of content that is available for a specific view (portlet) is defined in the xml file with a key name that uniquely identifies this content across the entire set of content in the xml file. The xml file also includes a URL element that points to the physical content file served by a web server, usually in an html file. In addition to these two content xml elements, additional metadata can restrict the usage of the content to certain users. For example, content can be restricted by the user groups, user attributes, dates, etc., all of which will be processed in a central location, e.g., the service oriented content framework 210, thus taking the burden away from the individual user applications.

By way of a non-limiting illustrative example, an xml file for content related to a promotion may be as follows.

```
<portlet name="Promotion">
<view name="MainView">
<content name="DiamondPromotion">
<group>DiamondLevel</group>
<userprofile attribute="YtdStays" comparison = ">"
>50</userprofile>
<startdate>2006-01-01</startdate>
<enddate>2006-03-31</enddate>
<url>http://contnet.server.com/content/Promotion/triplepoints.html
</url>
</content>
<content name="GoldPromotion">
<group>GoldLevel</group>
<userprofile attribute="Ytdstays" comparison = ">"
>25</userprofile>
<startdate>2006-01-01</startdate>
<enddate>2006-03-31</enddate>
<url>http://contnet.server.com/content/Promotion/doublepoints.html
</url>
</content>
<content name="CommonPromotion">
<startdate>2006-01-01</startdate>
<enddate>2006-03-31</enddate>
<url>http://contnet. server.com/content/Promotion/
discountcarrental.html</url>
</content>
</view>
</portlet>
```

In this example, a portlet is named "Promotion" and includes one view named "MainView", with three possible pieces of content to display. In this example, all three pieces of content are valid from Jan. 1, 2006 to Mar. 31, 2006. The first two pieces of content are restricted by user groups and user attributes. By way of non-limiting example, the user groups may be defined by any string of characters such as "DiamondPromotion" and "GoldPromotion" and the user attribute may be "YtdStays" comparison=">">50</userprofile>. It should be understood that numerous other user groups and attributes are contemplated to be used with the invention, each associated with content types, e.g., promotions, news stories, emails, access requirements to confidential information, etc. The last view is for "CommonPromotion" which may be a default setting since this piece of content has no restrictions beyond the date range.

As in all embodiments of the invention, the service oriented content framework 210 processes the data on behalf of the portlet and only allows access to the correct pieces of content based on the user's qualification to view content. In this manner, the burden of content processing is removed from the content consumer applications, e.g., 220, 230, 240, etc., and keeps that functionality centrally located to enable a more robust and maintainable solution when managing content in a service oriented architecture.

The portlet has access to all the xml elements that describe the content and may show any piece of content that is returned from the service oriented content framework 210. So, using the above example of a "DiamondLevel" user, the portlet may show any information that is associated with year to date stays of greater than "50" which, in this example, would provide a URL pointing to http://contnet.server.com/content/Promotion/triplepoints.html.

In an embodiment, the order of the content is maintained, and in most cases, the portlet can now select the top-most piece of content using the service oriented content framework 210. However, the portlet may also obtain select content of all views, when the user qualifies for the highest level piece of content. Said more generally, a user that has qualified to view the highest level content may also view any lower level content. Alternatively, a sequence number or other attribute may be provided for each qualified level such that, for example, a sequence number of "1" would prevent the qualified user from viewing lower level content associated with a sequence number of "2" or higher. In this manner, the system and the method can automatically minimize access to the content to only the most relevant content i.e., highest qualified content.

In the system and method of the invention, security is implied by use of the portal engine, i.e., the portal controls access to the given content by virtue of accessing the service oriented content framework 210. More specifically, since access to content is centralized, i.e., access goes through the xml file, the xml file will provide the access control using information received by the portal and, if necessary, information retrieved from the LDAP, database or flat file, etc. It can be said that there is some authentication being provided by the portal, itself.

In an embodiment, the xml file(s) can be organized on a local portal file system by the package name of the portlet. The xml can be placed into a word file (flat file) and deployed to the service oriented content framework 210. In this manner, when the portal makes a call to the service oriented content framework 210, the service oriented content framework 210 can call up (deploy) the xml file.

The service oriented content framework 210 can deploy each xml file from a single file or can split the xml files into multiple files. In one embodiment, the service oriented content framework 210 can have a global based directory to define the specific deployed xml file. For example, the global directory can control and deploy the xml file(s) by portlet name (e.g., <portlet name="Promotion"> saved as "portlet.myview.xml") or view name (e.g., <view name="MainView"> saved as "myview.xml"). Thus, the name of the view being exposed can be contained in the name of the xml file. In a preferred embodiment, naming each file after the portal name can increase the search speed. This type of naming convention will enable access to all of the views associated with the portlet name.

Figure 3:
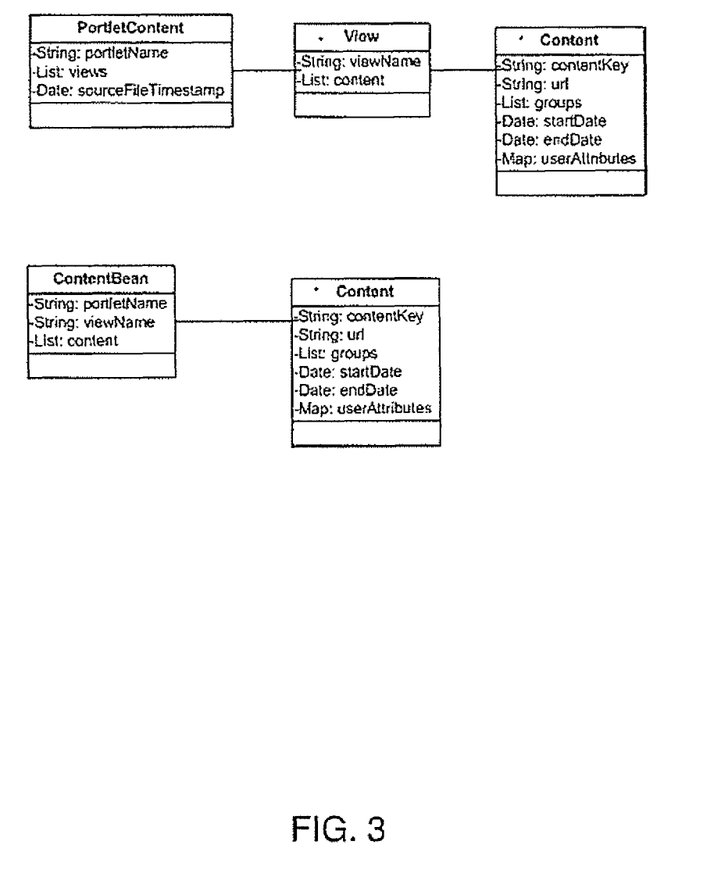
FIG. 3 is an example of an object map implemented in accordance with the invention.

The xml file can also be parsed and converted to an object map such as that shown in FIG. 3. The example object map of FIG. 3 shows the view and portlet name, in addition to start date, end date and other information of the xml file. In a more specific example, the PortletContent object contains string, list and date information of the associated xml file. In this way, both the portal (or other end user application) and the service oriented content framework 210 can gain access to the portlet and view the name for deployment when requests are sent to it by the portal (or other end user application). Those of skill in the art will recognize that the object map may take on many different forms, any of which will contain relevant information from the xml file.

Also, a timestamp of the xml file can be captured. By capturing a timestamp of the xml file an object can be read one time in memory, without having to be re-read for each deployment. However, a change of the xml file will still result in a refreshed PortletContent object.

In further embodiments, a web service deployment can be deployed as a stand alone system or can be implemented in a composite system. For example, as a composite system, the web service deployment can wrap around another web service or a legacy/custom application. Thus, the web service deployment can provide a mechanism to process content of another system, e.g., legacy/custom application, thereby exposing content as if directly received from the wrapped application.

By way of example, in a composite system with a legacy/custom application, the web service deployment may retrieve information on the user's behalf from the legacy/custom application (e.g., AS/400 manufactured and serviced by IBM corporation). The web service deployment can process the content from the legacy/custom application, via an xml file, and pass the content back to the requester (user). In an embodiment, the portlet can be exposed as if accessed directly from the wrapped service, using the same service name and WSDL (Web Services Description Language) information (with augmentation). Thus, the web service deployment, as a wrap around system, acts as an intermediary to gain access to the wrapped service.

A non-limiting illustrative example of the xml file for the web service deployment is provided below.

```
<Service name="CheckPromotion">
<method name="DiamondPromotion">
<group>DiamondLevel</group>
<userprofile attribute="YtdStays" comparison = ">" >50</userprofile>
<startdate>2006-01-01</startdate>
<enddate>2006-03-31</enddate>
<url>http://contnet.server.com/content/Promotion/triplepointsl</url>
<credential></credential>
</method>
<method name="GoldPromotion">
<group>GoldLevel</group>
<userprofile attribute="YtdStays">25</userprofile>
<startdate>2006-01-01</startdate>
<enddate>2006-03-31</enddate>
<url>http://contnet.server.com/content/Promotion/doublepoints</url>
<credential></credential>
</method>
<method name="CommonPromotion">
<startdate>2006-01-01</startdate>
<enddate>2006-03-31</enddate>
<url>http://contnet.server.com/content/Promotion/discountcarrentall</url>
<credential></credential>
</method>
</Service>
```

In the web service deployment there are some discreet differences in the xml file, compared to the portal deployment. For example, in the web service deployment, the root level of the xml tree is defined by the service name, instead of a portlet name. Additionally, in the web service deployment, the view branch from the xml tree is removed and the content branch is converted to method branches. For example, "<content name="Diamond Promotion">" is now defined as <"method name="GoldPromotion">".

Moreover, in the web service deployment, the credential or digital right used to access the wrapped service can expire on the date coded in the xml file. By way of explanation, a credential may be issued by the web service deployment which would encompass the start and end dates of the exposure to the view. When the end date is reached, the credentials will prevent the user from viewing the portlet. Alternatively, since the web service deployment may be a wrap around service, the web service deployment can be bypassed so that the portlet can remain exposed externally, i.e., by a service which bypasses the web service deployment aspect of the invention.

The credential can also be modified so that the portlet can be exposed to only some users of the web service deployment. In such an embodiment, the system and method can partially expire service or content based of the user, group, or other factor through the xml configuration. Thus, users with special attributes may bypass the web service deployment, gaining access to the portlet, even though access to the content through the web service deployment has expired for other users.

Additionally, the web service deployment does not replace the WSDL, but augments the WSDL by creating expiration dates for the credentials. This augmentation can be done without having to access the credential. By way of example, the web service deployment may augment WSDL 1.1, which is incorporated herein by reference in its entirety. (See, Web Services Description Language (WSDL) 1.1, W3C Note 15 Mar. 2001, viewable at http://www.w3.org/TR/wsdl, the contents of which are incorporated herein by reference in its entirety). The web service deployment may also utilize the JSR 168 Portlet Specification standard, which is incorporated herein by reference in is entirety herein. As should be known to one of skill in the art, the JSR 168 Portlet Specification enables interoperability between Portlets and Portals and defines a set of APIs for portal computing addressing the areas of aggregation, personalization, presentation and security. (See, e.g., http://jcp.org/aboutJava/communityprocess/review/jsr/168/, the contents of which website is incorporated by reference herein in its entirety herein).

Figure 4:
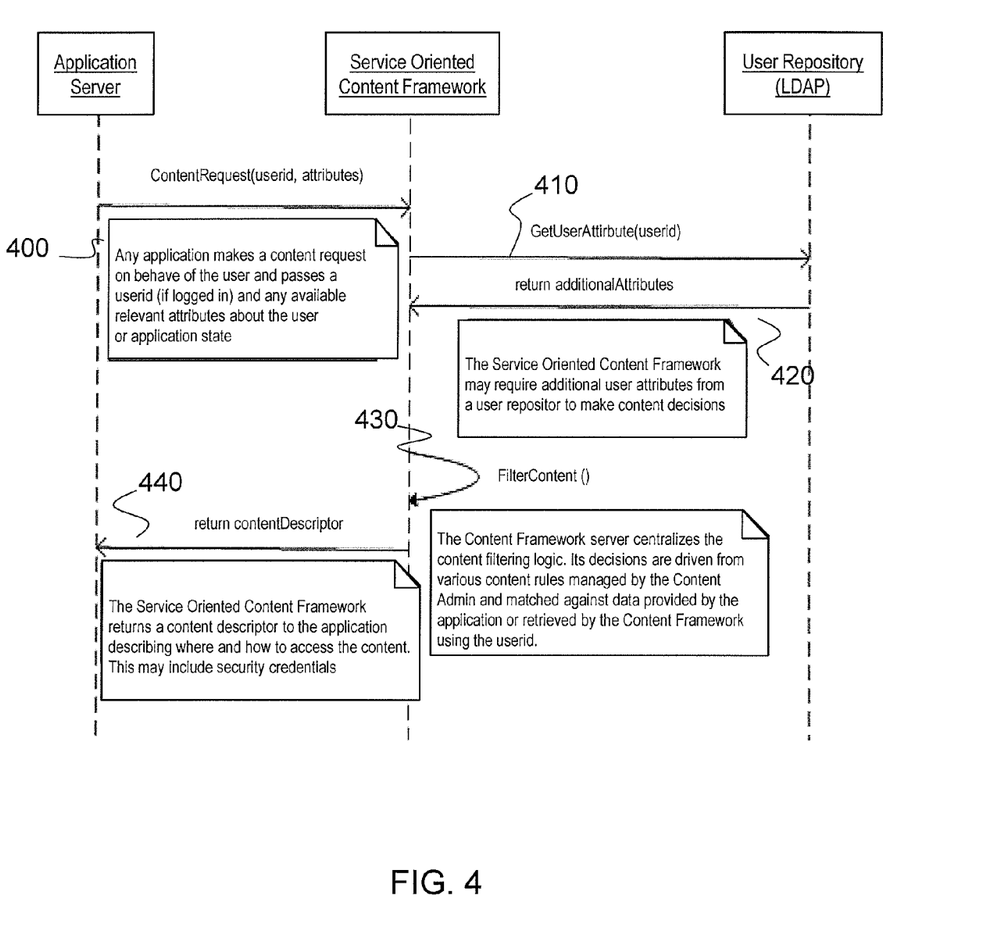
FIG. 4 is a swim lane diagram showing steps implementing aspects of the invention.

FIG. 4 is a swim lane diagram showing steps of an embodiment of the invention. "Swim lane" diagrams may be used to show the relationship between the various "actors" in the processes and to define the steps involved in the processes. FIG. 4 may equally represent a high-level block diagram of components of the invention implementing the steps thereof. The steps of FIG. 4 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. The steps of FIG. 4 may also be implemented by the embodiment of FIG. 1, in a server, in a client server relationship, or user workstation environment. Additionally, the invention can take the form of an entirely hardware embodiment, an entirely software embodiment or an embodiment containing both hardware and software elements. A software implementation includes but is not limited to firmware, resident software, microcode, etc.

Referring back to FIG. 4, three actors are shown including the application server, e.g., 220, 230, 240, the service oriented content framework 210 and the user repository (LDAP, database or flat file, etc.). At step 400, the application server provides a content request to the service oriented content framework. The content request may include userid and other attributes, as discussed in detail above. In an embodiment, any application may make a consent request passing a user id (if logged in) and any available relevant information about the user or application to the service oriented content framework. At step 410, any additional required attributes can be obtained directly from an LDAP, database or flat file, etc. In an embodiment, the request may not include any attributes or any relevant attributes. In such case, the system and method may obtain all required attributes from the LDAP, database or flat file, etc. At step 420, the attributes obtained from the LDAP, database or flat file, etc. are sent to the service oriented content framework.

At step 430, the service oriented content framework calls up the appropriate xml file, and obtains information from a content engine. The service oriented content framework centralizes the content filtering logic, with the decisions of the service oriented content framework being driven from various content rules managed by the content administrator. That is, the service oriented content framework processes content though the xml file, which is matched by the application or retrieved by the service oriented content framework using the user id and/or other attributes (as discussed above). At step 440, the service oriented content framework returns the content descriptor, e.g., URL, to the application server, pointing to where content may be obtained. This step may include the use of credentials.

In conclusion, in a large portal application with numerous content selection rules, selecting the right pieces of content for the user's authorization, attributes, and business rules becomes complex. Also, in web service distribution, the ability to control access to groups in a given time period or other constraint is very useful to be defined in a human readable format. The system and method of the invention reduces this complexity and abstracts the logic from the portlets and web services. The content metadata, including restrictions and content source, which is defined in the xml file facilitates filtering the content for each user and makes it available to the portlets.

Additionally, the service oriented content framework uniquely provides another step in the path to technology-agnostic services by using a flat xml file. The value of this concept is the ability to expose content from various implementations of content management engines along with its associated restrictions and facilitate delivery of the appropriate content based on date, time, user authorization, user profile attributes, etc. This approach keeps the flexibility of content configuration and restriction with the content administrator and provides content consumers with only relevant content for their user base and scope. The system and method of the invention also removes the burden of content processing from the content consumer applications and keeps that functionality centrally located to enable a more robust and maintainable solution when managing content in a service oriented architecture. For web service deployments, it is possible to provide a wrap around application to a web service and/or legacy/custom application. As a wrap around service, it is possible to access content of the wrapped service, as if directly accessed from the wrapped service.

While the invention has been described in terms of embodiments, those skilled in the art will recognize that the invention can be practiced with modifications and in the spirit and scope of the appended claims.

What is claimed is:

1. A method, comprising:
receiving a request for web content associated with a portlet from one or more end user applications, wherein the portlet is a content area within a web page that occupies a window within the web page and is arranged to display different types of information;
receiving user information from the one or more end user applications;
receiving additional user information from an LDAP;
calling an xml file associated with the portlet, wherein the xml file describes all available content for the portlet by defining plural pieces of content that are available for the portlet;
determining, based on the user information and the additional user information, which of the plural pieces of content of the portlet the user is qualified to view, wherein the determining is performed by a central service oriented content framework independent of the one or more end user applications; and
returning to the one or more end user applications a content descriptor that points to where the qualified content may be obtained.

2. The method of claim 1, further comprising providing a key name in the xml file that uniquely identifies the content across an entire set of content and includes a URL element that points to a physical content file.

3. The method of claim 1, wherein the portlet has access to all xml elements of the xml file.

4. The method of claim 1, wherein the xml file includes metadata that restricts usage of the pieces of content to certain of the one or more end user applications.

5. The method of claim 1, wherein access to the pieces of content is centralized through the xml file, which provides access control using the user information and the additional user information.

6. The method of claim 1, further comprising organizing the xml file on a local file system by package name of a portlet.

7. The method of claim 1, further comprising deploying the xml file from a single file or multiple files.

8. The method of claim 1, wherein the xml file is defined in a global based directory.

9. The method of claim 8, further comprising naming the xml file after a portal name.

10. The method of claim 1, further comprising parsing and converting the xml file to an object map.

11. The method of claim 1, further comprising timestamping the xml file.

12. The method of claim 1, further comprising retrieving all pieces of content, associated with the request, from one or more repositories, wherein the one or more repositories are implementations of content management engines.

13. The method of claim 1, further comprising processing the pieces of content using attributes defined in an xml file.

14. The method of claim 13, wherein the attributes are obtained from at least one of the LDAP and the one or more end user applications.

15. The method of claim 14, wherein the attributes include at least one of user authorization and user profile attributes.

16. The method of claim 1, further comprising processing the pieces of content along with associated restrictions.

17. The method of claim 16, wherein the associated restrictions, if met, preclude the relevant content from being exposed.

18. The method of claim 1, further comprising removing a burden of content processing from the one or more end user applications.

19. The method of claim 1, further comprising a web service deployment.

20. The method of claim 19, further comprising rejecting a request before retrieving a credential by expiring a service of the web service before the credential is retrieved.

21. The method of claim 19, further comprising augmenting a UDDI (Universal Description, Discovery and Integration) Registry to expire the service before returning the service to the user if the service is expired.

22. The method of claim 19, further comprising partially expiring the service thereby allowing access to the service to select users.

23. The method of claim 19, wherein the web service deployment is configured to be a stand alone system or a composite system wrapped around at least one of a web service and legacy/custom system.

24. The method of claim 23, wherein, in the composite system, the web service deployment retrieves the relevant content through processing an xml file.

25. The method of claim 24, further comprising exposing a portlet containing the relevant content as if accessed directly from the at least one of a web service and legacy/custom system.

26. The method of claim 25, further comprising exposing the portlet using a same service name and WSDL (Web Services Description Language) information with augmentation.

27. The method of claim 1, wherein the one or more end user applications is at least one of a portal, a legacy/custom application and a web service enabled application.

28. The method of claim 1, further comprising exposing only a highest level of the relevant content.

29. The method of claim 1, wherein the steps of claim 1 are provided on a subscription, advertising, and/or fee basis.

30. The method of claim 29, wherein the steps of claim 29 are provided by a service provider.

31. The method of claim 1, wherein the steps of claim 1 are at least one of created, maintained and supported on a computer infrastructure that performs the steps of claim 1.

32. A system comprising a processor, storage media, and a server having a database containing pieces of content, and at least one of a hardware and software component which:
   receives a request for web content associated with a portlet from one or more end user applications, wherein the portlet is a content area within a web page that occupies a window within the web page and is arranged to display different types of information;
   receives user information from the one or more end user applications;
   receives additional user information from an LDAP;
   calls an xml file associated with the portlet, wherein the xml file describes all available content for the portlet by defining plural pieces of content that are available for the portlet;
   determines, based on the user information and the additional user information, which of the plural pieces of content of the portlet the user is qualified to view, wherein the determining is performed by a central service oriented content framework independent of the one or more end user applications; and
   returns to the one or more end user applications a content descriptor that points to where the qualified content may be obtained.

33. The system of claim 32, wherein each piece of content that is available for a specific view (portlet) is defined in the xml file.

34. The system of claim 33, wherein the portlet has access to all xml elements that describe the content.

35. The system of claim 32, wherein the xml file comprising a key name that uniquely identifies the content across an entire set of content and a URL element that points to a physical content file.

36. The system of claim 32, wherein the xml file includes metadata that restricts usage of the pieces of content to certain of the one or more applications.

37. The system of claim 32, wherein access to the pieces of content is centralized through the xml file, which provides access control using the user information and the additional user information.

38. The system of claim 32, wherein the xml file is deployed from a single file or multiple files.

39. The system of claim 32, wherein the xml file is defined in a global based directory.

40. The system of claim 32, wherein at least one of a hardware and software component parses and converts the xml file to an object map.

41. The system of claim 32, wherein at least one of a hardware and software component timestamps the xml file.

42. The system of claim 32, wherein the calling, the determining, and the returning is provided by a service provider on a subscription, advertising, and/or fee basis.

43. The system of claim 32, further comprising processing the pieces of content against attributes to determine the relevant content, wherein the attributes are obtained from at least one of the LDAP and the one or more user applications.

44. The system of claim 43, wherein the attributes define restrictions to the content, wherein, if the restrictions are met, preclude the relevant content from being exposed.

45. The system of claim 32, wherein the system is a web service deployment which is configured to be a stand alone system or implemented in a composite system wrapped around at least one of a web service and legacy/custom system.

46. The system of claim 45, wherein, in the composite system, the web service deployment exposes a portlet containing the relevant content as if accessed directly from the web service and/or legacy/custom system.

47. A computer program product comprising a computer usable storage medium having readable program code embodied in the medium, the computer program product when executed on a computing device causes the computing device to:
   receive a request for web content associated with a portlet from one or more end user applications, wherein the portlet is a content area within a web page that occupies a window within the web page and is arranged to display different types of information;
   receive user information from the one or more end user applications;
   receive additional user information from an LDAP;
   call an xml file associated with the portlet, wherein the xml file describes all available content for the portlet by defining plural pieces of content that are available for the portlet;
   determine, based on the user information and the additional user information, which of the plural pieces of content of the portlet the user is qualified to view, wherein the determining is performed by a central service oriented content framework independent of the one or more end user applications; and return to the one or more end user applications a content descriptor that points to where the qualified content may be obtained.

48. A method for deploying an application for processing content, comprising:

providing a computer infrastructure being operable to:

receive a request for web content associated with a portlet from one or more end user applications, wherein the portlet is a content area within a web page that occupies a window within the web page and is arranged to display different types of information;

receive user information from the one or more end user applications;

receive additional user information from an LDAP;

call an xml file associated with the portlet, wherein the xml file describes all available content for the portlet by defining plural pieces of content that are available for the portlet;

determine, based on the user information and the additional user information, which of the plural pieces of content of the portlet the user is qualified to view, wherein the determining is performed by a central service oriented content framework independent of the one or more end user applications; and return to the one or more end user applications a content descriptor that points to where the qualified content may be obtained.

\* \* \* \* \*